(12) United States Patent
Beitia et al.

(10) Patent No.: US 10,488,199 B2
(45) Date of Patent: Nov. 26, 2019

(54) GYROSCOPE WITH PIEZOELECTRIC MONOCRYSTAL TRANSDUCERS

(71) Applicant: Innalabs Limited, Dublin (IE)

(72) Inventors: Jose Beitia, Dublin (IE); Alain Renault, Le Cannet (FR); Christopher Fell, Dublin (IE)

(73) Assignee: Innalabs Limited, Dublin (IE)

( * ) Notice: Subject to any disclaimer, the term of this patent is extended or adjusted under 35 U.S.C. 154(b) by 129 days.

(21) Appl. No.: 15/535,131

(22) PCT Filed: Dec. 17, 2015

(86) PCT No.: PCT/EP2015/080363
§ 371 (c)(1),
(2) Date: Jun. 12, 2017

(87) PCT Pub. No.: WO2016/097222
PCT Pub. Date: Jun. 23, 2016

(65) Prior Publication Data
US 2017/0350700 A1    Dec. 7, 2017

(30) Foreign Application Priority Data
Dec. 18, 2014 (GB) .................................. 1422620.3

(51) Int. Cl.
*G01C 19/56* (2012.01)
*G01C 19/00* (2013.01)
*G01C 19/5642* (2012.01)
*G01C 19/5783* (2012.01)

(52) U.S. Cl.
CPC ..... *G01C 19/5642* (2013.01); *G01C 19/5783* (2013.01)

(58) Field of Classification Search
None
See application file for complete search history.

(56) References Cited

U.S. PATENT DOCUMENTS

| 5,056,366 A | 10/1991 | Fersht et al. |
| 6,018,212 A | 1/2000 | Kikuchi et al. |
| 7,528,533 B2 | 5/2009 | Ochi et al. |
| 9,322,655 B2 * | 4/2016 | Chikovani ............ G01C 19/56 |
| 2005/0092084 A1 * | 5/2005 | Fell ...................... G01C 19/567 |
| | | 73/504.13 |
| 2007/0228896 A1 | 10/2007 | Matsushita |

(Continued)

FOREIGN PATENT DOCUMENTS

| EP | 0441020 A1 | 8/1991 |
| EP | 2669629 A1 | 12/2013 |

(Continued)

OTHER PUBLICATIONS

Search report in PCT/EP2015/080363 dated Jun. 3, 2016.
(Continued)

*Primary Examiner* — Judy Nguyen
*Assistant Examiner* — Ruben C Parco, Jr.
(74) *Attorney, Agent, or Firm* — Bardmesser Law Group (57) ABSTRACT

A gyroscope comprising a resonant structure and a plurality of transducers configured to drive a vibrational mode in the resonant structure and detect vibrations of the resonant structure, wherein at least one of the plurality of transducers comprises a piezoelectric mono crystal.

20 Claims, 5 Drawing Sheets (56) References Cited

U.S. PATENT DOCUMENTS

| | | |
|---|---|---|
| 2008/0111051 A1 | 5/2008 | Ochi et al. |
| 2008/0111451 A1* | 5/2008 | Ochi ................. G01C 19/5607 |
| | | 310/321 |
| 2009/0007664 A1 | 1/2009 | Kikuchi et al. |
| 2010/0064804 A1* | 3/2010 | Kawakubo ............ G01C 19/56 |
| | | 73/504.03 |
| 2010/0111184 A1 | 5/2010 | Shimizu et al. |
| 2010/0154542 A1* | 6/2010 | Okon ................. G01C 19/5691 |
| | | 73/504.12 |
| 2013/0233074 A1 | 9/2013 | Durston et al. |

FOREIGN PATENT DOCUMENTS

| | | | |
|---|---|---|---|
| JP | 2005249395 A * | 9/2005 | |
| JP | 2005291858 A * | 10/2005 | ......... G01C 19/5642 |
| RU | 2439495 C2 | 1/2012 | |
| WO | 2011144899 A1 | 11/2011 | |
| WO | WO-2012067534 A1 * | 5/2012 | ......... G01C 19/5691 |

OTHER PUBLICATIONS

UKIPO Search Report in GB 1422620.3, dated Jun. 15, 2015.
Farrokh Ayazi, A HARPSS Polysilicon Vibrating Ring Gyroscope, Journal of Microelectromechanical Systems, vol. 10, No. 2, Jun. 2001.

\* cited by examiner

GYROSCOPE WITH PIEZOELECTRIC MONOCRYSTAL TRANSDUCERS

CROSS REFERENCE TO RELATED APPLICATIONS

This application is a US National Phase of PCT/EP2015/080363, filed on 17 Dec. 2015, which claims priority to GB 1422620.3, filed on 18 Dec. 2014, both of which are incorporated by reference in their entirety.

BACKGROUND OF THE INVENTION

Field of the Invention

The present invention relates to a vibrating gyroscope.

Background of the Related Art

A gyroscope is a device which may be used to measure a rate of angular rotation. Measurements of the rate of angular rotation of the gyroscope may be integrated over time in order to determine a change in the angular orientation of the gyroscope. If an initial orientation of the gyroscope is known then a determination of a change in the angular orientation of the gyroscope may be used to derive the orientation of the gyroscope at a time after the change in the angular orientation. A gyroscope may, for example, be used in applications such as inertial navigation systems (INS), ground vehicle stabilization, aircraft, ships and/or other applications.

A vibrating gyroscope is a form of gyroscope in which a resonant structure is caused to vibrate. A vibrating gyroscope may be referred to as a vibrating structure gyroscope and/or a Coriolis vibrating gyroscope (CVG). A wide variety of resonant structures may be used to form a vibrating gyroscope including rings, cylinders, hemispheres, tuning forks and beams. Vibrating gyroscopes have many advantages over traditional gyroscopes (based on a spinning mass) and over gyroscopes based on fiber-optic and/or other optical technologies. For example, vibrating gyroscopes may be cheaper than fiber optic gyroscopes, and may be smaller and include fewer parts than spinning mass gyroscopes.

It is an object of the present invention to obviate or mitigate a disadvantage associated with known vibrating gyroscopes.

SUMMARY OF THE INVENTION

According to a first aspect of the invention there is provided a gyroscope comprising a resonant structure and a plurality of transducers configured to drive a vibrational mode in the resonant structure and detect vibrations of the resonant structure, wherein at least one of the plurality of transducers comprises a piezoelectric monocrystal.

Detected vibrations of the resonant structure may be used to determine a rate of angular rotation of the gyroscope. A scale factor of the gyroscope may be used in order to determine the rate of angular rotation of the gyroscope from the detected vibrations of the resonant structure. The scale factor may vary over time and/or may vary with variations in temperature. Unaccounted for variations in the scale factor of the gyroscope may reduce the accuracy with which the rate of angular rotation of the gyroscope may be determined. The use of a piezoelectric monocrystal transducer advantageously reduces variations in the scale factor of the gyroscope thereby increasing the accuracy with which the rate of angular rotation of the gyroscope may be determined.

The plurality of transducers may include a first group of transducers which are configured to drive and detect a primary vibration mode of the resonant structure and a second group of transducers which are configured to detect and null a secondary vibration mode of the resonant structure.

The first group of transducers and the second group of transducers may include an equal number of transducers which comprise a piezoelectric monocrystal.

At least one of the first group of transducers may comprise a piezoelectric monocrystal and may be configured to detect the primary vibration mode.

At least one of the second group of transducers may comprise a piezoelectric monocrystal and may be configured to null the secondary vibration mode.

At least one of the plurality of transducers may comprise a non-monocrystal piezoelectric transducer.

The first group of transducers and the second group of transducers may include an equal number of transducers which comprise a non-monocrystal piezoelectric transducer.

At least one of the first group of transducers may comprise a non-monocrystal piezoelectric transducer and may be configured to drive the primary vibration mode.

At least one of the second group of transducers may comprise a non-monocrystal piezoelectric transducer and may be configured to detect the secondary vibration mode.

The plurality of transducers may comprise at least one primary drive transducer configured to drive a primary vibration mode, at least one primary detection transducer configured to detect the primary vibration mode, at least one secondary detection transducer configured to detect a secondary vibration mode and at least one secondary drive transducer configured to null the secondary vibration mode.

The at least one primary detection transducer and the at least one secondary drive transducer may each comprise a piezoelectric monocrystal.

The at least one primary drive transducer and the at least one secondary detection transducer may each comprise a non-monocrystal piezoelectric transducer.

The at least one primary drive transducer may comprise a pair of primary drive transducers. The at least one primary detection transducer may comprise a pair of primary detection transducers. The at least one secondary drive transducer may comprise a pair of secondary drive transducers. The at least one secondary detection transducer may comprise a pair of secondary detection transducers.

The monocrystal may comprise langasite.

The transducer which comprises a non-monocrystal piezoelectric transducer may comprise PZT.

Each of the plurality of transducers may be bonded to a surface of the resonant structure. A surface of the resonant structure may include holes formed in the resonant structure. Electric wires may extend through the holes and may be electrically connected to the transducers. The resonant structure may comprise a plurality of beams.

According to a second aspect of the invention there is provided a method of determining the rate of angular rotation of a gyroscope, the method comprising driving a vibrational mode in a resonant structure, detecting vibrations in the resonant structure and determining the rate of angular rotation of the gyroscope from the detected vibrations, wherein, the vibrational mode is driven and the vibrations are detected by a plurality of transducers which includes at least one transducer which comprises a piezoelectric monocrystal.

The plurality of transducers may include a first group of transducers which drive and detect a primary vibration mode of the resonant structure and a second group of transducers which detect and null a secondary vibration mode of the resonant structure.

The first group of transducers and the second group of transducers may include an equal number of transducers which comprise a piezoelectric monocrystal.

At least one of the first group of transducers may comprise a piezoelectric monocrystal and may detect the primary vibration mode.

At least one of the second group of transducers may comprise a piezoelectric monocrystal and may null the secondary vibration mode.

At least one of the plurality of transducers may comprise a non-monocrystal piezoelectric transducer.

The first group of transducers and the second group of transducers may include an equal number transducers which comprise a non-monocrystal piezoelectric transducer.

At least one of the first group of transducers may comprise a non-monocrystal piezoelectric transducer and may drive the primary vibration mode.

At least one of the second group of transducers may comprise a non-monocrystal piezoelectric transducer and may detect the secondary vibration mode.

The plurality of transducers may comprise at least one primary drive transducer which drives a primary vibration mode, at least one primary detection transducer which detects the primary vibration mode, at least one secondary detection transducer which detects a secondary vibration mode and at least one secondary drive transducer which nulls the secondary vibration mode.

The at least one primary detection transducer and the at least one secondary drive transducer may each comprise a piezoelectric monocrystal.

The at least one primary drive transducer and the at least one secondary detection transducer may each comprise a non-monocrystal piezoelectric transducer.

The at least one primary drive transducer may comprise a pair of primary drive transducers. The at least one primary detection transducer may comprise a pair of primary detection transducers. The at least one secondary drive transducer may comprise a pair of secondary drive transducers. The at least one secondary detection transducer may comprise a pair of secondary detection transducers.

The piezoelectric monocrystal may comprise langasite.

The transducer which comprises a non-monocrystal piezoelectric transducer, may comprise PZT.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
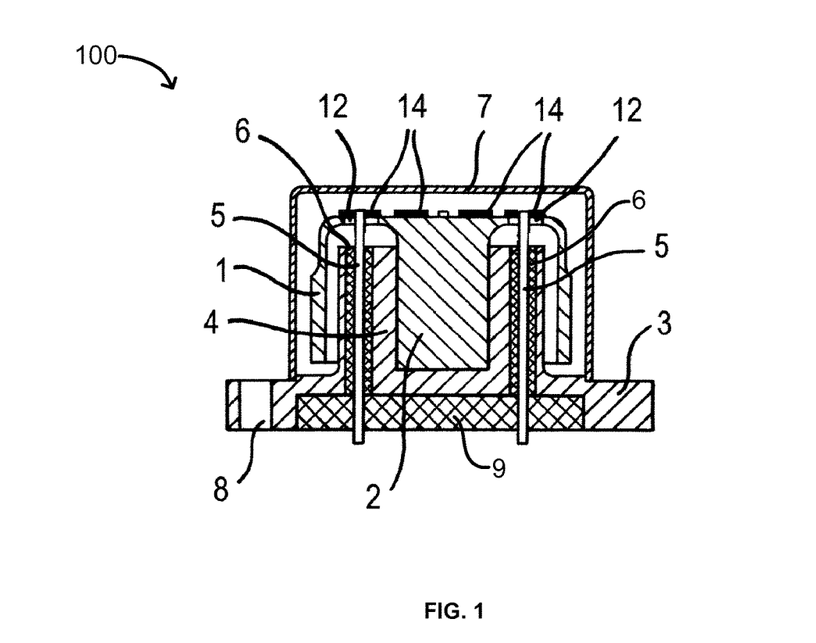
FIG. 1 is a schematic illustration of a gyroscope.

FIG. 1 is a schematic depiction of a cross-sectional view of an embodiment of a vibrating gyroscope 100. The gyroscope 100 includes a resonant structure 1. In the embodiment which is depicted in FIG. 1 the resonant structure 1 has a generally cylindrical shape. However in other embodiments the resonant structure 1 may be shaped differently than is shown in FIG. 1. For example, the resonant structure 1 may have a hemispherical or toroidal shape. The resonant structure 1 may comprise one or more of a range of different materials. For example, the resonant structure 1 may comprise a metal, or fused quartz (fused silica).

The resonant structure 1 is mounted on a base 3. The base 3 includes holes 8 which may be used to attach the gyroscope 100 to a unit the rate of angular rotation of which the gyroscope 100 is configured to measure. For example, a fastener (e.g. a screw) may be received by a hole 8 in order to fasten the gyroscope 100 to a unit to be measured. The resonant structure 1 includes a stem 2 which is secured in the base 3.

The base 3 includes a cup-shaped projection 4 which is configured to receive the stem 2 of the resonant structure 1. The resonant structure 1 is covered by a cap 7 which allows the pressure conditions inside the cap 7 to be controlled. For example, a vacuum may be maintained inside the cap 7.

The cup-shaped projection 4 includes holes through which wires 5 extend. The wires 5 are used to pass signals into and/or out of the gyroscope 100. The holes in the base 3 are surrounded by electrically insulating material 6 which insulates the wires 5 from the rest of the base 3. The electrically insulating material 6 also serves to provide a gas tight seal around the wires 5. The gas tight seal prevents gas from entering the volume between the cap 7 and the base 3 and therefore allows the vacuum inside the cap 7 to be maintained.

The wires 5 extend through holes 12 in the resonant structure 1. The wires 5 are electrically connected to a plurality of transducers 14 which are positioned on the resonant structure 1. Electronic signals are passed along the wires 5 to and from the transducers 14, thereby allowing electronic signals to be sent through the base 3 to and from the transducers 14 from outside of the gyroscope 100.

Some of the transducers 14 generate electrical signals. Electrical signals which are generated in the transducers 14 pass along wires 5 and out of the gyroscope 100. Some of the transducers 14 receive electrical signals which pass along the wires 5 and to the transducers 14. A circuit board 9 is positioned in the base 3. The circuit board 9 comprises one or more amplifiers which are configured to amplify electrical signals which pass out of the gyroscope 100.

The transducers 14 are mechanically coupled to the resonant structure 1 (e.g. bonded to the resonant structure 1). As will be described in further detail below, some of the transducers 14 are configured to actuate the resonant structure 1 in response to electronic signals provided to the transducers 14, so as to excite a vibrational mode in the resonant structure. Some of the transducers 14 are configured to convert vibrations of the resonant structure into electronic signals which correspond to vibrations of the resonant structure 1.

Further details of the structure of a gyroscope of the type which is shown in FIG. 1 are disclosed by published European Patent Application EP2669629 which is hereby incorporated by reference in its entirety. EP2669629 also discloses other configurations of gyroscopes which may be used in conjunction with the present invention.

Figure 2:
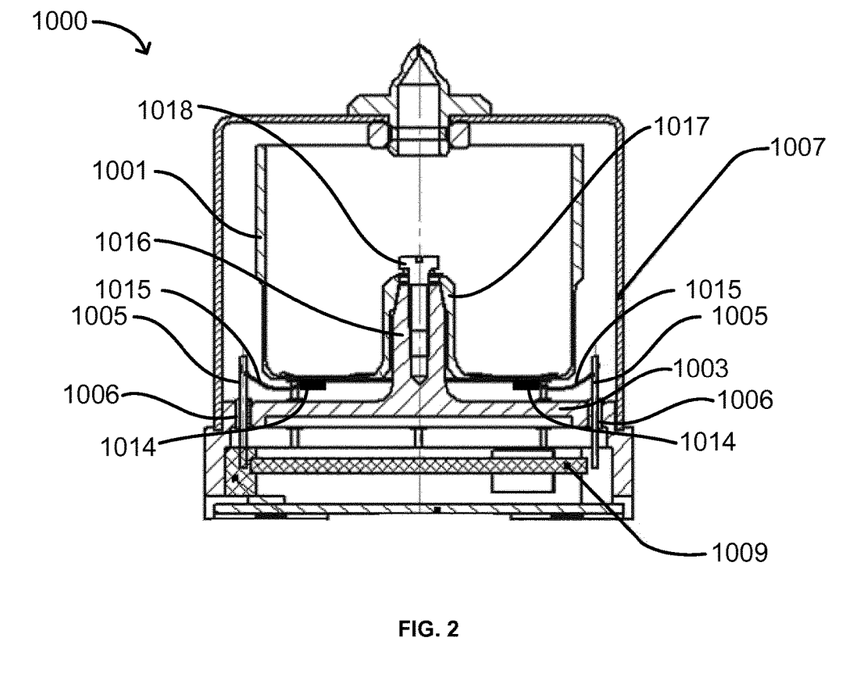
FIG. 2 is a schematic illustration of an alternative embodiment of a gyroscope.

FIG. 2 is a schematic depiction of an alternative embodiment of a gyroscope 1000. The gyroscope 1000 of FIG. 2 comprises a cup-shaped resonant structure 1001 mounted on a base 1003. The base 1003 comprises a protrusion 1016 which is received by a recess 1017 in the resonant structure 1001. The resonant structure 1001 is secured to the base 1003 with a fastener 1018 which passes through the resonant structure 1001 and is fastened to the protrusion 1016 in the base 1003. The resonant structure 1001 is covered by a cap 1007 which allows a vacuum to be maintained inside the cap 1007.

The base 1003 includes holes through which wires 1005 extend. The holes in the base 1003 are surrounded by electrically insulating material 1006 which insulates the wires 1005 from the rest of the base 3. The electrically insulating material 6 also serves to provide a gas tight seal around the wires 1005. Electrical connections 1005 provide electrical connections between ends of the wires 1005 and transducers 1014 which are located on the underside of the resonant structure 1000. At their other ends, the wires 1005 are electrically connected to a circuit board 1009 which is disposed below the base 1003. The circuit board 1009 comprises one or more amplifiers which are configured to amplify electronic signals which pass out of the gyroscope 1000.

The transducers 1014 are mechanically coupled to the resonant structure 1001 (e.g. bonded to the resonant structure 1). Some of the transducers 1014 are configured to actuate the resonant structure 1001 in response to electronic signals provided to the transducers 1014 so as to excite a vibrational mode in the resonant structure 1001. Some of the transducers 1014 are configured to detect vibrations of the resonant structure and generate electronic signals which correspond to vibrations of the resonant structure 1001.

Figure 3:
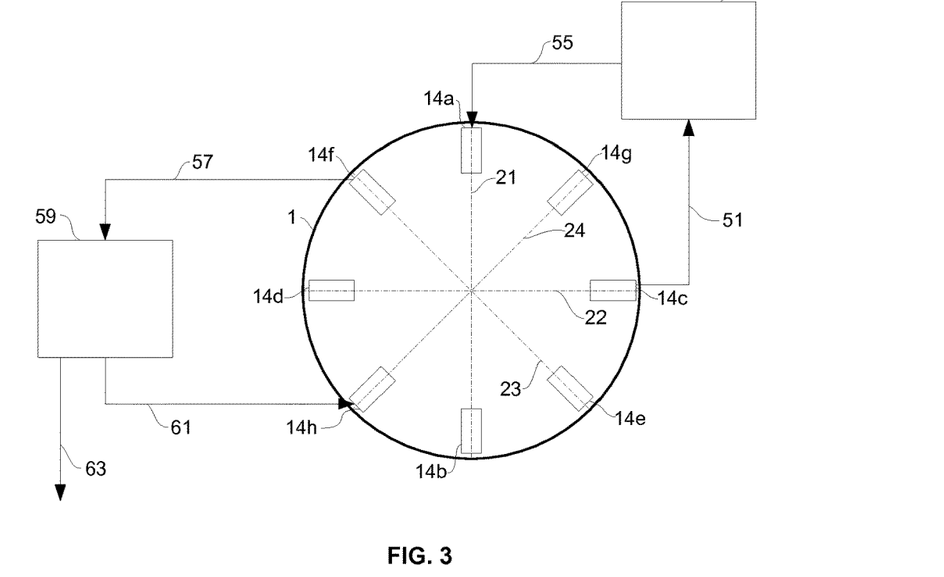
FIG. 3 is a schematic illustration of a resonant structure of the gyroscope of FIG. 1 or FIG. 2.

FIG. 3 is a schematic depiction of a resonant structure 1. The resonant structure shown in FIG. 3 may, for example, be the resonant structure 1 of the gyroscope 100 of FIG. 1 as viewed from above. Alternatively the resonant structure may be the resonant structure 1001 of FIG. 2 as viewed from below. Positioned on the resonant structure 1 are eight transducers 14a-14h. For ease of illustration no holes are shown in the resonant structure 1 in FIG. 3. However it will be appreciated that electrical connections are provided to each of the transducers 14a-14h in order to provide and/or receive signals to and/or from the transducers 14a-14h. The electrical connections may extend through holes in the resonant structure (not shown in FIG. 3). The transducers 14a-14h are arranged around the resonant structure 1 such that the angular separation between adjacent transducers is approximately 45° C. The transducers 14a-14h are mechanically coupled to the upper surface of the resonant structure 1 (e.g. by bonding). The transducers 14a-14h comprise piezoelectric materials in which mechanical stress is converted to electrical signals and vice versa.

A pair of primary drive transducers 14a and 14b are arranged at opposite ends of a primary drive axis 21 which extends across the resonant structure 1. A pair of primary detection transducers 14c and 14d are arranged at opposite ends of a primary detection axis 22. The primary detection axis 22 forms an angle of 90° C. with the primary drive axis 21. A pair of secondary detection transducers 14e and 14f are arranged at opposite ends of a secondary detection axis 23. The secondary detection axis 23 forms an angle of 45° C. with both the primary drive axis 21 and the primary detection axis 22. A pair of secondary drive transducers 14g and 14h are positioned at opposite ends of a secondary drive axis 24. The secondary drive axis 24 forms an angle of 90° C. with the secondary detection axis 23 and forms an angle of 45° C. with both the primary drive axis 21 and the primary detection axis 22.

Figure 4:
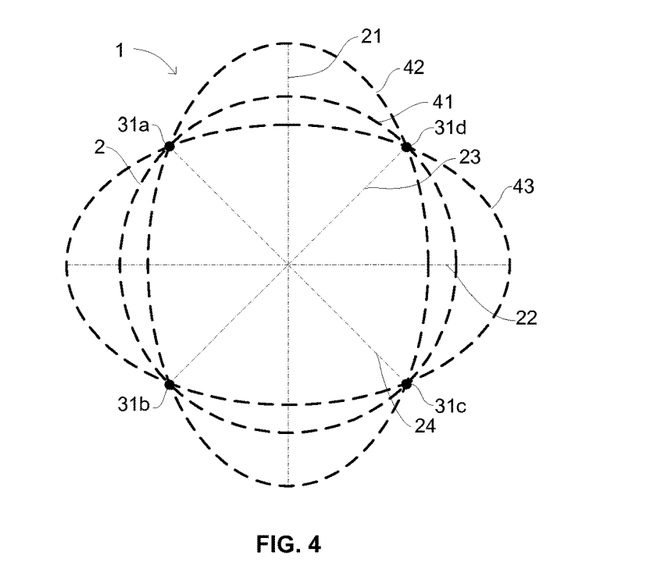
FIG. 4 is a schematic illustration of the resonant structure of FIG. 3 at different positions during a vibration.

The primary drive transducers 14a, 14b are configured to actuate the resonant structure 1 so as to drive vibrations along the primary drive axis 21. FIG. 4 is a schematic depiction of the resonant structure 2 at different positions during a vibration which is driven along the primary drive axis 21. For ease of illustration the transducers 14a-14h are omitted from FIG. 4. The primary drive transducers 14a, 14b apply forces to the resonant structure 1 such that the resonant structure 1 oscillates between a first position 42 in which the resonant structure 1 is elongated into an ellipse whose semi-major axis is substantially aligned with the primary drive axis 21 and a second position 43 in which the resonant structure 1 is elongated into an ellipse whose semi-major axis is substantially aligned with the primary detection axis 22. It will be appreciated that during the oscillation, the resonant structure 1 transitions through a third position 41 which is the position which the resonant structure 1 relaxes to when the resonant structure 1 is not forced to vibrate.

If the vibrating gyroscope 100 is stationary then the vibrations of the resonant structure 1 are such that there are four nodes 31a-31d at which the resonant structure 1 is substantially stationary. The nodes 31a-31d are substantially positioned on the secondary detection axis 23 and the secondary drive axis 24. The points at which the resonant structure 1 intersects the primary drive axis 21 and the primary detection axis 22 may be referred to as anti-nodes since these points represent points at which the amplitude of the vibration of the resonant structure 1 is at a maximum.

When the gyroscope 100 undergoes a rotation the primary drive axis 21 rotates and the vibrations in the resonant structure 1 are driven (by the primary drive transducers 14a, 14b) along a different direction to the direction in which they were driven prior to the rotation. However, the vibrations in the resonant structure 1 have an inertia which causes vibrations to persist in the same direction as the direction in which the vibrations were occurring before the gyroscope 100 rotated. The vibrations in the resonant structure 1 rotate with the rotation of the gyroscope 100, however the inertia of the vibrations causes the rotation of the vibrations to lag behind the rotation of the gyroscope 100. A rotation of the gyroscope 100 therefore causes vibrations to occur in directions which are not aligned with the primary drive axis 21 or the primary detection axis 22. If no force is applied to the nodes 31a-31d then this effect causes a movement of the resonant structure 1 to be induced at the nodes 31a-31d.

In order to measure the rotation rate of the gyroscope 100, the secondary drive transducers 14g, 14h may act to null the nodes 31a-31d such that substantially no displacement of the resonant structure 1 occurs at the nodes 31a-31d. As will be described further below the force which is applied in order to null the nodes 31a-31d is directly proportional to the rate of rotation of the gyroscope 100 and thus measurement of this force may be used to measure the rate of rotation of the gyroscope 100.

As was described above the primary drive transducers 14a, 14b are configured to actuate the resonant structure 1 so as to excite a vibrational mode in the resonant structure 1. The vibrational mode which is excited by the primary drive transducers 14a, 14b may be referred to as a primary vibrational mode. The primary vibrational mode consists of vibrations along the primary drive axis 21 and the primary detection axis 22 as shown in FIG. 4. The primary detection transducers 14c, 14d are configured to detect the vibrations of the resonant structure 1 along the primary detection axis 22. Motion of the resonant structure 1 induces a mechanical stress in the primary detection transducers 14c, 14d. The mechanical stress induces a charge flow within a piezoelectric material which forms the transducers 14c, 14d, thereby generating an electrical signal. The electrical signal is output from the primary detection transducers as a primary detection signal 51. The primary detection signal 51 corresponds to the vibrations of the resonant structure 1 along the primary detection axis 22.

The primary detection signal 51 is input to a primary feedback loop 53 as shown in FIG. 3. The primary feedback loop 53 outputs a primary drive signal 55 which forms an input to the primary drive transducers 14a, 14b. The primary drive signal 55 is an electrical signal which induces a strain in a piezoelectric material which forms the transducers 14c, 14d. The strain in the piezoelectric material is transferred to the resonant structure 1 and induces motion of the resonant structure which corresponds to the primary drive signal 55.

For ease of illustration the primary detection signal 51 is only shown in FIG. 3 as originating from the transducer 14c and the primary drive signal is only shown as being input to the transducer 14a. However it will be appreciated that in practice both of the primary detection transducers 14c, 14d contribute to the primary detection signal 51 and the primary drive signal 55 is input to both of the primary drive transducers 14a, 14b.

The primary feedback loop 53 controls the primary drive transducers 14a, 14b based on measurements made by the primary detection transducers 14c, 14d. The primary feedback loop 53 comprises a phase locked loop and an automatic gain control loop (not shown). The phase locked loop is configured to ensure that the frequency of the primary vibration mode which is driven by the primary drive transducers 14a, 14b remains at a resonant frequency of the resonant structure 1. The amplitude gain control loop is configured to ensure that the amplitude of the primary vibration mode remains at a desired amplitude. If the amplitude and/or the frequency of the primary vibration mode deviates from the desired amplitude and the resonant frequency then the primary feedback loop 53 acts to control the primary drive transducers so as to correct for any such deviation.

As was explained above rotation of the gyroscope 100 will cause vibrations to occur in directions which are not aligned with the primary drive axis 21 or the primary detection axis 22. In particular vibrations occur along the secondary detection axis 23.

Vibrations along the secondary detection axis 23 may be referred to as a secondary vibration mode. Motion of the resonant structure 1 along the secondary detection axis 23 induces a mechanical stress in the secondary detection transducers 14e, 14f. The mechanical stress induces a charge flow within piezoelectric materials which form the transducers 14e, 14f, thereby generating an electrical signal. The electrical signal is output from the secondary detection transducers as a secondary detection signal 57.

The secondary detection signal 57 corresponds to the vibrations of the resonant structure 1 along the secondary detection axis 23. The secondary detection signal 57 is input to a secondary feedback loop 59 as shown in FIG. 3. The secondary feedback loop 59 outputs a secondary drive signal 61 which forms an input to the secondary drive transducers 14h, 14g. The secondary drive signal 61 is an electrical signal which induces a strain in piezoelectric materials which form the secondary drive transducers 14h, 14g.

For ease of illustration the secondary detection signal 57 is only shown in FIG. 3 as originating from the transducer 14f and the secondary drive signal 61 is only shown as being input to the transducer 14h. However it will be appreciated that in practice both of the secondary detection transducers 14e, 14f contribute to the secondary detection signal 57 and the secondary drive signal 61 is input to both of the secondary drive transducers 14g, 14h.

The primary feedback loop 53, the secondary feedback loop 59 and connections between the feedback loops 53, 59 and the transducers 14 are only shown schematically in FIG. 3. In practice the primary feedback loop 53 and the secondary feedback loop 59 may comprise analogue and/or digital electronics which may be located on one or more electronics boards (not shown). The one or more electronics boards may, for example, be positioned in a base of the gyroscope. For example, the primary feedback loop 53 and the secondary feedback loop 59 may be located on the circuit board 9 of the gyroscope of FIG. 1 or the circuit board 1009 of the gyroscope of FIG. 2. Alternatively the primary feedback loop 53 and the secondary feedback loop 59 may be positioned elsewhere and may be separate from the base of the gyroscope. A circuit board 9, 1009 in the base of a gyroscope may be configured to amplify output signals and provide the signals to the primary and/or the secondary feedback loops 53, 59 which are positioned elsewhere. Electrical connections between the feedback loops 53, 59 and the transducers 14 may be made via wires 5 which extend through the base of the gyroscope.

The secondary feedback loop 59 controls the secondary drive transducers 14g, 14h based on measurements made by the secondary detection transducers 14e, 14f. The secondary feedback loop 59 is configured to output a secondary drive signal 61 which causes the secondary drive transducers 14g, 14h to null the secondary vibration mode such that substantially no vibrations occur along the secondary detection axis 23 or the secondary drive axis 24.

The secondary feedback loop 59 also outputs a measurement signal 63 which is proportional to the rate of rotation of the gyroscope 100. The gyroscope 100 has a scale factor SF which is a proportionality constant which relates the measurement signal 63 which is output from the secondary feedback loop 59 to the rate of rotation of the gyroscope 100. The scale factor SF is typically defined as the voltage of the measurement signal 63 per unit of rate of rotation of the gyroscope 100 (typically given in units of volts per degree per second).

The scale factor SF depends on the gain $G_{SDr}$ of the secondary drive transducers 14g, 14h, the gain $G_{PDe}$ of the primary detection transducers and a reference amplitude Vref. The reference amplitude Vref is a target amplitude of the primary vibration mode and remains constant with time and temperature. The scale factor SF is given by:

$$SF = k \frac{V_{ref}}{G_{PDe} G_{SDr}} \quad (1)$$

where k is a proportionality constant. In order to determine the rate of rotation of the gyroscope 100 knowledge of the scale factor SF is required. The scale factor SF may be determined through a calibration process. However the scale factor SF may vary with time and changes in temperature. In particular variations of the scale factor may be caused by changes in the gains $G_{SDr}$, $G_{PDe}$ of the secondary drive transducers 14g, 14h and the primary detection 14c, 14d transducers, which may be a function of time and/or temperature.

Unaccounted for variations of the scale factor SF (e.g. due to variations in transducer gains) leads to an uncertainty in the rotation rate of the gyroscope 100 as determined from the measurement signal 63. For some applications of a gyroscope 100 it is desirable to be able to determine the rate of rotation of the gyroscope 100 to a high accuracy. For example, in applications in which a gyroscope is subjected to high rotation rates it may be desirable for the rate of rotation of the gyroscope to be determined to a high accuracy. Such applications may, for example, include the use of a gyroscope in an aircraft attitude and heading reference system (AHRS) which may be subjected to high rates of rotation of, for example, up to 400 degrees per second (e.g. during an aircraft roll). In such applications it may, for example, be desirable to determine the rate of rotation of a gyroscope to an accuracy of approximately 0.1% or better. Variation of the scale factor SF is typically the factor which limits the accuracy with which a gyroscope 100 can determine the rate of rotation. It is therefore desirable to provide a gyroscope 100 for which variations in the scale factor SF are reduced such that the accuracy with which the rate of rotation is determined is increased.

Typically the transducers 14a-14h are formed from lead zirconate titanate (PZT). PZT is a piezoelectric material which converts mechanical stress to electrical signals and vice versa with a high gain. PZT may for example be formed by using a sintering process. The high gain of PZT transducers is advantageous since a relative low voltage primary drive signal 55 can be used to drive the primary drive transducers 14a, 14b in order to drive a primary vibration mode having a given amplitude. Additionally the vibrations which are detected by the secondary detection transducers 14e, 14f lead to the generation of a relatively high voltage secondary detection signal 14e, 14f. This allows the secondary vibration mode to be measured with a relatively high signal to noise ratio.

However the gain of a PZT transducer varies both with time and changes in temperature. The gain of a PZT transducer also experiences hysteresis effects which result in the gain of a PZT transducer being an ill-defined function of temperature. It will be appreciated from equation 1 that variations in the gain of PZT transducers (in particular the primary detection transducers 14c, 14d and the secondary drive transducers 14g, 14h) causes variations in the scale factor SF which disadvantageously affect the accuracy with which the rate of angular rotation is determined by the gyroscope 100.

Figure 5:
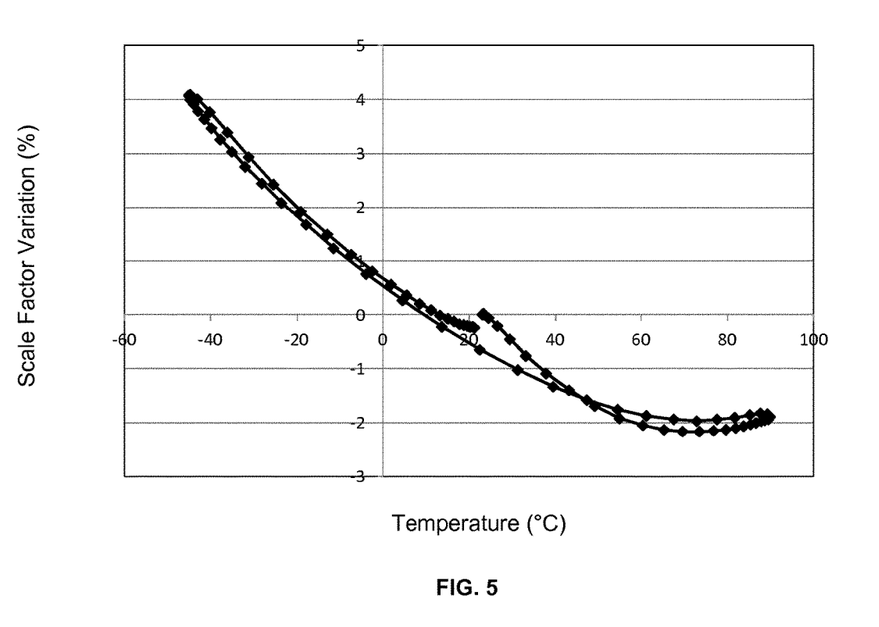
FIG. 5 is a schematic representation of the variation in a scale factor with temperature of a gyroscope which comprises PZT transducers.

FIG. 5 is a schematic representation of the percentage variation of the scale factor SF of a gyroscope 100 as a function of temperature. The transducers 14 of the gyroscope 100 are PZT transducers. In the example which is shown in FIG. 5 the gyroscope 100 experiences increases and decreases in temperature. The temperature varies between approximately −45° C. and 90° C. It can be seen from FIG. 5 that the scale factor SF undergoes relatively large variations with changes in temperature. Over the temperature range which is shown in FIG. 5 the scale factor varies by over 7%. Such variations can cause considerable uncertainties in the rate of rotation which is determined by the gyroscope 100.

It can further be seen from FIG. 5 that the scale factor SF is a non-linear function of temperature and that the scale factor SF is subject to hysteresis effects such that the scale factor SF does not return to the same value after equal increases and decreases in temperature. The scale factor SF is not therefore a well-defined function of temperature. This means that it is difficult to account for variations in the scale factor SF when determining the rate of rotation of the gyroscope 100 and consequently variations in the scale factor SF limit the accuracy with which the rate of rotation of the gyroscope 100 can be determined.

The present invention contemplates the use of transducers which are formed from a piezoelectric monocrystal. A monocrystal is a crystalline material comprising a continuous crystal lattice which is formed from a periodic repetition of a unit cell. A monocrystal may alternatively be referred to as a single crystal. A transducer may for example comprise a lanthanum gallium silicate monocrystal which exhibits piezoelectric properties. Lanthanum gallium silicate is commonly known as langasite.

A transducer which comprises a langasite monocrystal may be referred to as a langasite transducer. A langasite monocrystal exhibits highly elastic properties and has low internal damping when compared to PZT. These properties of langasite mean that the gain of a langasite transducer varies less with time and temperature than the gain of a PZT transducer. The use of transducers whose gain varies less with time and temperature in a gyroscope 100 results in the scale factor SF of the gyroscope being more stable with time and temperature than when PZT transducers are used.

A transducer which comprises a piezoelectric monocrystal other than langasite may also exhibit relatively low gain variation with time and temperature and may also be suitable for use in a gyroscope. For example, a transducer which comprises a lead magnesium niobate-lead titanate (PMPNT) monocrystal may advantageously be used in a gyroscope. Other piezoelectric monocrystals which may be used in accordance with embodiments of the invention include, for example, gallium phosphate, quartz and/or tourmaline monocrystals. Other piezoelectric monocrystals not explicitly referred to herein may be used. As would understood by the person skilled in the art, such piezoelectric monocrystals would function in the same way, and thus such piezoelectric monocrystals fall within the scope of the invention.

Figure 6:
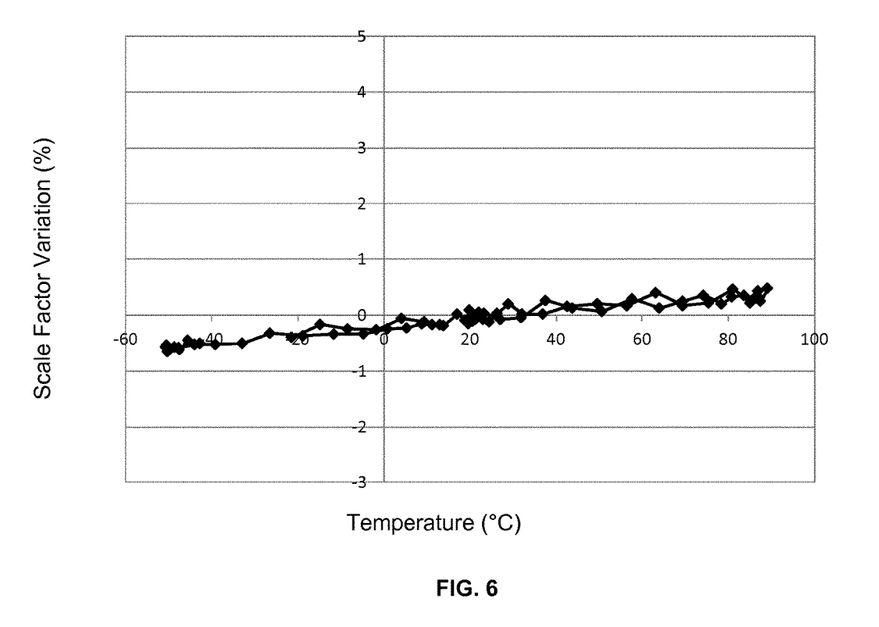
FIG. 6 is a schematic representation of the variation in a scale factor with temperature of a gyroscope which comprises langasite transducers.

FIG. 6 is a schematic representation of the percentage variation of the scale factor SF as a function of temperature of a gyroscope 100 in which the transducers 14 are langasite transducers. The temperature range which is shown in FIG. 6 is the same temperature range which is shown in FIG. 5.

Similarly to the example which was shown in FIG. 5, the scale factor SF is shown in FIG. 6 during increases and decreases in temperature. It can be seen from FIG. 6 that the variation in the scale factor SF as a function of temperature is considerably less when langasite transducers are used than when PZT transducers are used (as shown in FIG. 5). It can further be seen that when using langasite transducers the variation of the scale factor SF with temperature is approximately linear and the scale factor SF is a well-defined function of temperature which does not experience significant hysteresis effects during successive increases and decreases in temperature.

The smaller variation in the scale factor SF as a function of temperature which is exhibited by langasite transducers allows the rate of rotation of the gyroscope to be determined with greater accuracy than when using PZT transducers. The scale factor SF being a well-defined function of temperature allows changes in the scale factor SF to be accounted for when determining the rate of rotation of a gyroscope 100, provided that the temperature is known. For example, the temperature may be measured and the measurement of the temperature used to adjust the scale factor SF which is used to determine the rate of rotation of the gyroscope 100 (based on the known variation of the scale factor SF as a function of temperature).

In an embodiment of the invention all of the transducers 14a-14h of a gyroscope 100 are langasite transducers (or other transducers formed from a piezoelectric monocrystal). The langasite transducers may comprise langasite monocrystals which are plated on their top and bottom surfaces with a metallic film. The metallic films may, for example, be formed from gold. The metallic films allow electrical contacts to be formed with the langasite crystal. The bottom metallic film may be used to form an electrical contact with the resonant structure 100. The top metallic film may be used to form an electrical contact with a wire which may be bonded to the metallic film. The wire may be connected to the primary feedback loop 53 or the secondary feedback loop 59 and may carry the primary detection signal 51, the primary drive signal 55, the secondary detection signal 57 or the secondary drive signal 61 (depending on the role of the transducer).

Whilst the use of a transducer comprising a piezoelectric monocrystal (e.g. a langasite transducer) advantageously reduces the variation in the scale factor SF when compared to using PZT transducers, monocrystal transducers typically have a smaller gain than PZT transducers. For example, the gain of a monocrystal transducer may be approximately six times less than the gain of an equivalent PZT transducer. The smaller gain of monocrystal transducers means that in order to generate a vibration mode in the resonant structure of a given amplitude the amplitude of the primary drive signal 55 is increased when the primary drive transducers 14a, 14b are monocrystal transducers as opposed to when the primary drive transducers 14a, 14b are PZT transducers. This may be achieved by increasing the voltage of the primary drive signal 55. However in some cases this may require undesirable changes to be made in the electronics which form the primary feedback loop 53.

The reduced gain of monocrystal transducers may additionally affect the signal to noise ratio with which vibrations of the resonant structure may be measured. For example, the signal to noise ratio of the secondary detection signal 57 may be reduced when the secondary detection transducers 14e, 14f are monocrystal transducers as opposed to PZT transducers.

In some embodiments of the invention some of the transducers 14a-14h are monocrystal transducers (e.g. langasite transducers) and the remaining transducers are PZT transducers. The roles of the monocrystal transducers and the PZT transducers may be chosen in order to utilize the higher gain of PZT transducers and the greater gain stability of monocrystal transducers.

Figure 7:
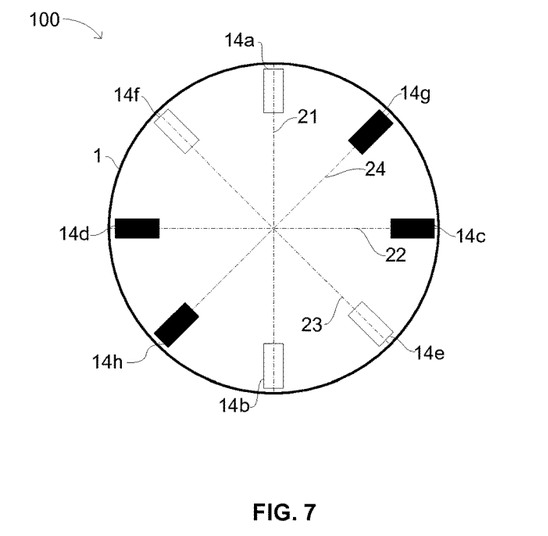
FIG. 7 is a schematic illustration of a gyroscope comprising a single crystal transducer.

FIG. 7 is a schematic depiction of an embodiment of a gyroscope 100 which comprises langasite transducers and PZT transducers. The PZT transducers are shown in FIG. 7 as white blocks and the langasite transducers are shown as black blocks. As can be seen from equation 1 the scale factor SF of the gyroscope 100 is a function of the gain of the primary detection transducers 14c, 14d and the gain of the secondary drive transducers 14g, 14h. In order to increase the temperature stability of the scale factor SF the primary detection transducers 14c, 14d and the secondary drive transducers 14g, 14h are langasite transducers. In alternative embodiments, one or more of the langasite transducers may be replaced with transducers comprising other piezoelectric monocrystals.

The primary drive transducers 14a, 14b and the secondary detection transducers 14e, 14f are PZT transducers. As was explained above PZT transducers have a higher gain than langasite transducers. The use of PZT transducers for the primary drive transducers 14a, 14b advantageously means that a primary drive signal 55 of a given amplitude will excite a primary vibration mode having a larger amplitude than if the primary drive transducers 14a, 14b are langasite transducers. The use of PZT transducers for the secondary detection transducers 14e, 14f advantageously increases the signal to noise ratio with which the secondary vibration mode is measured. An increase in the signal to noise ratio with which the secondary vibration mode is measured increases the signal to noise ratio of the determined rotation rate of the gyroscope 100.

The arrangement of langasite transducers and PZT transducers which is shown in FIG. 7 advantageously combines the high gain of PZT transducers with the greater gain stability of langasite transducers.

In some embodiments one or more of the langasite transducers may be replaced with other monocrystal transducers. For example, a transducer comprising a PMPNT monocrystal may be used. The use of PZT transducers (which have a relatively high gain) as the primary drive transducers 14a, 14b advantageously allows a primary vibration mode having a relatively large amplitude to be driven in the resonant structure 1 without the use of high drive voltages. The primary drive transducers 14a, 14b could be monocrystal transducers. However use of monocrystal primary drive transducers 14a, 14b may result in a reduction in the amplitude of primary vibration mode unless the voltage of the primary drive signal 55 is increased (which may increase the complexity of the electronics in the gyroscope). Reducing the amplitude of the primary vibration mode will lead to a decrease in the amplitude of the secondary vibration mode.

The amplitude of vibrations along the secondary detection axis 23 which result from a given rate of rotation of the gyroscope will therefore decrease. This will result in a decrease in the sensitivity of measurements made by the secondary detection transducers 14e, 14f to changes in the rate of rotation of the gyroscope, and thus decrease the signal to noise ratio with which the rate of rotation is determined. The signal to noise ratio with which the rate of rotation is determined also depends on the gain of the secondary detection transducers 14e, 14f. The use of high gain PZT transducers both as the primary drive transducers 14a, 14b and the secondary detection transducers 14e, 14f therefore advantageously increases the signal to noise ratio with which the rate of rotation of the gyroscope is determined whilst allowing relatively low drive voltages to be utilized in the gyroscope (compared with a gyroscope which only uses monocrystals).

As was described above, the high gain of PZT transducers is advantageous for the primary drive transducers 14a, 14b and the secondary detection transducers 14e, 14f. However it is advantageous to use monocrystal transducers for the primary detection transducers 14c, 14d and the secondary drive transducers 14g, 14h since it is the gains of these transducers which directly affect the scale factor SF of the gyroscope.

The increased gain stability of monocrystal transducers (when compared to, for example, PZT transducers) advantageously increases the stability of the scale factor SF of the gyroscope, thereby increasing the accuracy with which the rate of rotation of the gyroscope is measured.

In order to compensate for the lower gain of monocrystal transducers (when compared to, for example, PZT transducers) the amplification of the primary detection signal 51 and the secondary drive signal 61 in the first and second feedback loops 53, 59 may be increased.

As was explained above, the arrangement of transducers which is shown in FIG. 7 in which the primary drive transducers 14a, 14b and the secondary detection transducers 14e, 14f are PZT transducers and in which the secondary drive transducers 14g, 14h and the primary detection transducers 14c, 14d are langasite transducers advantageously increases the stability of the scale factor SF whilst increasing the signal to noise ratio with which the rate of rotation of the gyroscope 100 is determined.

However in other embodiments other arrangements of transducers may be used. In general at least one of the transducers is a monocrystal transducer (e.g. a langasite transducer). One or more of the transducers may be a PZT transducer.

Whilst embodiments have been described above in which non-monocrystal transducers are PZT transducers, in other embodiments other non-monocrystal transducers may instead be used.

A monocrystal transducer (e.g. a langasite transducer) and a PZT transducer have different mechanical properties which may affect characteristics of a vibration mode which is driven and/or detected by a transducer. For example, the type of transducer which is used to drive or detect a vibration mode may affect the mass and stiffness of the material which is vibrated and any damping of the vibrations. These effects may be relatively minor. However it may be desirable for the same number of each type of transducer to be involved in each vibration mode. For, example it may be desirable for the number of monocrystal transducers which drive and/or detect the primary vibration mode (which may be referred to as primary transducers) to be the same as the number of monocrystal transducers which drive and/or detect the secondary vibration mode (which may be referred to as secondary transducers). It may be further desirable for the number of primary PZT transducers to be the same as the number of secondary PZT transducers. It will be appreciated that in the embodiment which is shown in FIG. 7 two of the primary transducers (the primary detection transducers 14c, 14d) and two of the secondary transducers (the secondary drive transducers 14g, 14h) are langasite transducers. Furthermore, two of the primary transducers (the primary drive transducers 14a, 14b) and two of the secondary transducers (the secondary detection transducers 14e, 14f) are PZT transducers. Each vibration mode therefore includes the same number of each type of transducer.

In the embodiments which have been described above each function (e.g. primary drive, primary detection, secondary drive and secondary detection) is performed by a pair of transducers. However in other embodiments other numbers of transducers may perform the different functions. For example, an embodiment of a gyroscope may comprise a single primary drive transducer, a single primary detection transducer, a single secondary drive transducer and a single secondary detection transducer. The use of a single transducer for each function as opposed to a pair of transducers as shown in FIGS. 3 and 7 may simplify the assembly of the gyroscope. However the use of a single transducer for each function may lead to smaller gains $G_{PDn}$, $G_{PDe}$, $G_{SDr}$ and $G_{SDe}$ of the primary and secondary modes when compared to the use of a pair of transducers for each function.

Whilst the invention has been described with reference to specific embodiments of a gyroscope, it will be appreciated that one or more monocrystal transducers (e.g. langasite transducers) may be used with any configuration of a vibrating gyroscope.

Figure 8A:
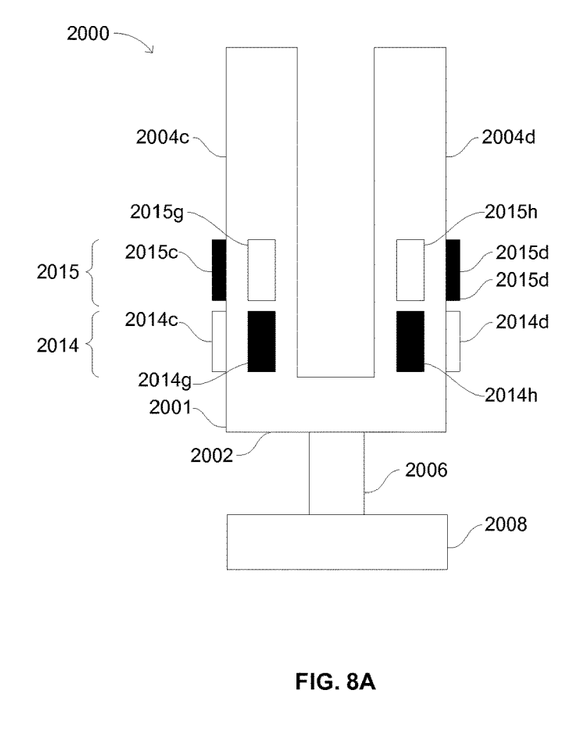
FIGS. 8A and 8B are schematic illustrations of a gyroscope according to an alternative embodiment of the invention.
Figure 8B:
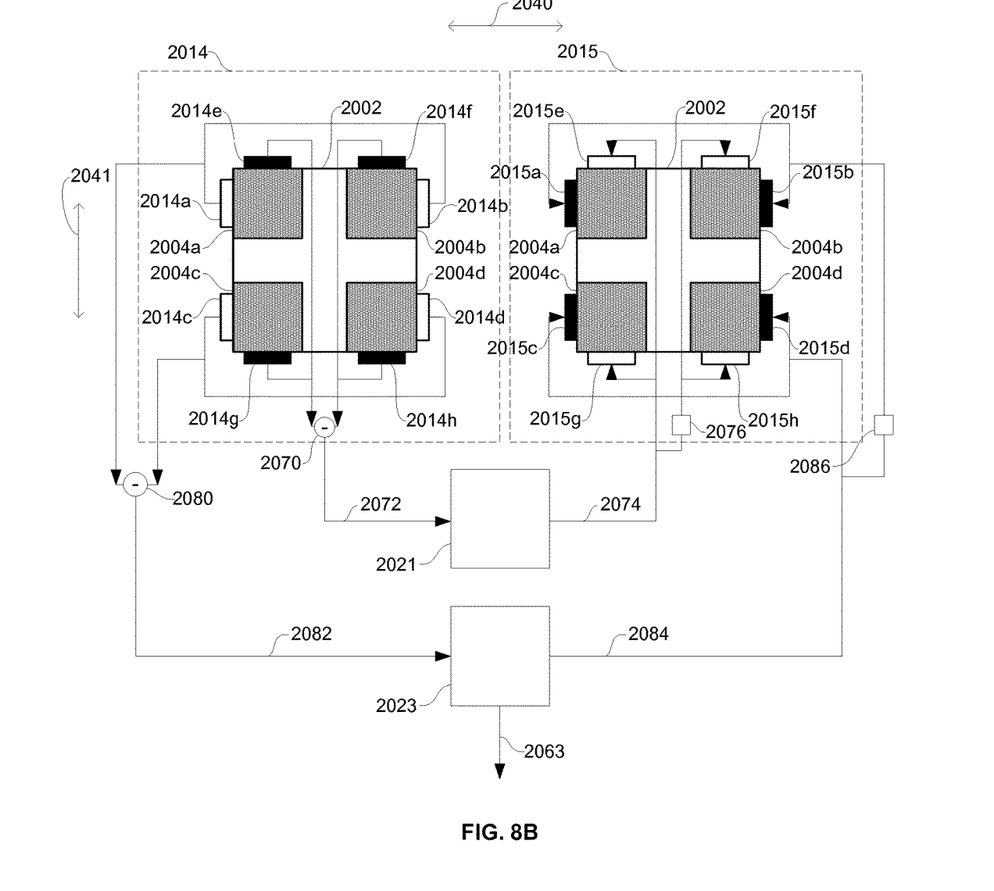

For example, FIGS. 8A and 8B schematically depict a vibrating gyroscope 2000 according to an alternative embodiment of the invention. The gyroscope 2000 comprises a resonant structure 2001 which resembles a pair of tuning forks joined at a common base 2002. FIG. 8A depicts a side profile of the gyroscope 2000. The resonant structure 2001 comprises four parallel beams 2004a-2004d (only two of which are visible in FIG. 8A) which are mounted on a base 2002. The base 2002 mechanically couples the beams 2004 such that vibrations in one of the beams causes vibrations in the other beams. The base 2002 is secured to a stand 2008 via a pillar 2006. The resonant structure 2001 may be sealed inside a cap (not shown) so as to allow a vacuum to be maintained around the resonant structure.

The beams 2004a-2004d are each provided with two vertical levels 2014, 2015 of transducers 2014a-2014h and 2015a-2015h (only some of which are visible in FIG. 8A). FIG. 8B is a schematic illustration of horizontal cross-sections of the two vertical levels 2014, 2015 of transducers. Also shown in FIG. 8B are connections between the transducers and a primary feedback loop 2021 and a secondary feedback loop 2023.

The transducers 2014a-2014h and 2015a-2015h may be operated in a number of different ways in order to drive and sense vibratory modes in the resonant structure. In an embodiment the transducers labelled 2015e, 2015f, 2015g and 2015h in FIGS. 8A and 8B perform the role of primary drive transducers and are configured to drive a primary vibration mode in the beams 2004a-2004d. The primary vibration mode may, for example, comprise vibrations of all four beams 2004a-2004d in the same direction. For example the beams 2004a-2004d may be driven by the primary drive transducers 2015e-2015h to vibrate from top to bottom as indicated by a double-headed arrow 2041 which is shown in FIG. 8B.

The primary vibration mode is detected by primary detection transducers which are labelled 2014e, 2014f, 2014g and 2014h in FIGS. 8A and 8B. The primary detection transducers provide inputs to the primary feedback loop 2021 and the primary feedback loop 2021 outputs signals which are provided to the primary drive transducers 2015e-2015h. The primary feedback loop 2021 may, for example, comprise analogue or digital electronics which act to control the primary drive transducers based upon measurements made by the primary detection transducers so as to maintain a primary vibration mode having a desired frequency, amplitude and phase.

Whilst the primary vibration mode may be such that the beams 2004a-2004d vibrate in the same direction 2041, the beams may vibrate such that the vibrations of some of the beams are out of phase with vibrations of one or more of the remaining beams. For example, in the embodiment which is shown in FIGS. 8A and 8B, the beams 2004a-2004d may be driven to vibrate such that vibrations of the beams 2004a and 2004c are in phase with each other but are out of phase with vibrations of the beams 2004b and 2004d. The signals which are formed at the primary detection transducers 2014e and 2014g (which are positioned on the beams 2004a and 2004c respectively) will therefore be out of phase with signals which are formed at the primary detection transducers 2014f and 2014h (which are positioned on the beams 2004a and 2004c respectively). The signals formed at the primary detection transducers 2014e and 2014g are subtracted from the signals formed at the primary detection transducers 2014f and 2014h at a subtractor 2070 so as to form an input signal 2072 to the primary feedback loop 2021 which is indicative of the amplitude, frequency and phase of the primary vibration mode.

The primary feedback loop 2021 outputs a signal 2074 which drives the primary drive transducers 2015e-2015h so as to maintain a primary vibration mode having a desired amplitude, frequency and phase. The signal which drives the transducers 2015f and 2015h is inverted by an inverter 2076 so as to maintain the phase relationship between the vibrations of the beams 2004a and 2004b with the vibration of the beams 2004b and 2004d.

Similarly to the embodiments of a vibrating gyroscope which were described above with reference to FIGS. 1-4, rotation of the gyroscope 2000 which is shown in FIGS. 8A and 8B may give rise to a secondary vibration mode. For example, rotation of the gyroscope 2000 may cause vibrations of the beams 2004a-2004d in the direction which is indicated by the double-headed arrow 2040 which is shown in FIG. 8B. The secondary vibration mode is detected by secondary detection transducers which are labelled 2014a, 2014b, 2014c and 2014d in FIG. 8B. The signals which are output from the transducers 2014a and 2014b are subtracted from the signals which are output from the transducers 2014c and 2014d at a subtractor 2080 so as to form an input signal 2082 to the secondary feedback loop 2023 which is indicative of the secondary vibration mode.

The secondary feedback loop 2023 outputs a signal 2084 which is provided to secondary drive transducers 2015a, 2015b, 2015c, 2015d. The secondary feedback loop 2023 may, for example, comprise analogue or digital electronics which act to control the secondary drive transducers 2015a-2015d based upon measurements made by the secondary detection transducers 2014a-2014d so as to substantially null the secondary vibration mode. Given the phase relationship between vibrations in the different beams 2004a-2004d, the signal which is provided to the transducers 2015a and 2015b is inverted by an inverter 2086.

In addition to outputting the signal 2084 which drives the secondary drive transducers 2015a-2015d, the secondary feedback loop 2023 also outputs a measurement signal 2063 which is proportional to the rate of rotation of the gyroscope 2000. As was described above with reference to other embodiments, the gyroscope 2000 has a scale factor SF which is a proportionality constant which relates the measurement signal 2063 which is output from the secondary feedback loop 2023 to the rate of rotation of the gyroscope 2000.

The scale factor SF depends on the gains $G_{SDr}$ of the secondary drive transducers 2015a-2015d and on the gains $G_{PDe}$ of the primary detection transducers 2014e-2014h.

In the embodiment which is shown in FIGS. 8A and 8B the secondary drive transducers 2015a-2015d and the primary detection transducers 2014e-2014h each comprise a piezoelectric monocrystal (denoted by black blocks in FIGS. 8A and 8B).

For example, the secondary drive transducers 2015a-2015d and the primary detection transducers 2014e-2014h may each comprise a langasite monocrystal. As was explained above with reference to other embodiments the gain of a transducer which comprises a piezoelectric monocrystal is relatively stable over time and with changes in temperature. Use of piezoelectric monocrystals for the secondary drive transducers 2015a-2015d and the primary detection transducers 2014e-2014h as shown in FIGS. 8A and 8B therefore advantageously results in a gyroscope 2000 having a scale factor SF which is relatively stable over time and with changes in temperature. For example, the scale factor SF of the gyroscope 2000 may vary with temperature in a similar way to the variation of the scale factor SF with temperature which is shown in FIG. 6. As was explained above, FIG. 6 shows a relatively small variation in the scale factor SF with temperature when compared to, for example, a case in which PZT transducers are used for the secondary drive transducers and the primary detection transducers as is shown in FIG. 5.

Whilst some of the transducers in the embodiment shown in FIGS. 8A and 8B comprise piezoelectric monocrystals, the primary drive transducers 2015e-2015h and the secondary detection transducers 2014a-2014d which are depicted with white blocks in FIGS. 8A and 8B may, for example, be PZT transducers. As was explained above with reference to other embodiments, PZT transducers have a relatively high gain (when compared to, for example, transducers comprising a piezoelectric monocrystal).

The use of PZT transducers (which have a relatively high gain) as the primary drive transducers 2015e-2015h advantageously allows a primary vibration mode having a relatively large amplitude to be driven in the resonant structure 2001 without the use of high drive voltages. The use of relatively high gain PZT transducers as the secondary detection transducers 2014a-2014d advantageously increases the signal to noise ratio with which the rate of rotation of the gyroscope is determined.

In other embodiments of a gyroscope of the form which is shown in FIGS. 8A and 8B more or less transducers than are shown in the figures may be used. For example, in an embodiment only two transducers may be used for each function (e.g. primary drive, primary detection, secondary drive and secondary detection) as opposed to the four transducers used for each function in FIGS. 8A and 8B. In general at least one of the transducers may comprise a piezoelectric monocrystal (e.g. a langasite monocrystal).

The transducers may include a first group of transducers which are configured to drive and detect a primary vibration mode and a second group of transducers which are configured to detect and null a secondary vibration mode. In some embodiments the first and second group of transducers may include equal numbers of transducers which comprise a piezoelectric monocrystal.

Having thus described a preferred embodiment, it should be apparent to those skilled in the art that certain advantages of the described method and apparatus have been achieved. In particular, those skilled in the art would appreciate that the proposed system and method provide for convenient uploading of the digital pictures and accompanying data.

It should also be appreciated that various modifications, adaptations and alternative embodiments thereof may be made within the scope and spirit of the present invention. The invention is further defined by the following claims.

What is claimed is:

1. A gyroscope comprising:
a resonant structure; and
a plurality of transducers configured to drive a vibrational mode in the resonant structure and detect vibrations of the resonant structure,
wherein at least one of the plurality of transducers comprises a piezoelectric monocrystal and at least one of the plurality of transducers comprises a piezoelectric non-monocrystal.

2. The gyroscope of claim 1, wherein the plurality of transducers includes a first group of transducers that are configured to drive and detect a primary vibration mode of the resonant structure and a second group of transducers that are configured to detect and null a secondary vibration mode of the resonant structure.

3. The gyroscope of claim 2, wherein the first group of transducers and the second group of transducers include an equal number of transducers that comprise a piezoelectric monocrystal.

4. The gyroscope of claim 2, wherein at least one of the first group of transducers that comprises a piezoelectric monocrystal is configured to detect the primary vibration mode.

5. The gyroscope of claim 2, wherein at least one of the second group of transducers that comprises a piezoelectric monocrystal is configured to null the secondary vibration mode.

6. The gyroscope of claim 2, wherein the first group of transducers and the second group of transducers include an equal number of transducers with a piezoelectric non-monocrystal.

7. The gyroscope of claim 1, wherein the piezoelectric non monocrystal transducer comprises PZT.

8. The gyroscope of claim 6, wherein the at least one of the first group of transducers that comprises the piezoelectric non-monocrystal transducer is configured to drive the primary vibration mode.

9. The gyroscope of claim 6, wherein at least one of the second group of transducers that comprises the piezoelectric non-monocrystal transducer is configured to detect the secondary vibration mode.

10. The gyroscope of claim 1, wherein the plurality of transducers comprises at least one primary drive transducer configured to drive a primary vibration mode, at least one primary detection transducer configured to detect the primary vibration mode, at least one secondary detection transducer configured to detect a secondary vibration mode and at least one secondary drive transducer configured to null the secondary vibration mode.

11. The gyroscope of claim 10, wherein the at least one primary detection transducer and the at least one secondary drive transducer each comprise a piezoelectric monocrystal.

12. The gyroscope of claim 10, wherein the at least one primary drive transducer and the at least one secondary detection transducer each comprise a piezoelectric non-monocrystal transducer.

13. The gyroscope of claim 1, wherein the piezoelectric monocrystal comprises langasite.

14. The gyroscope of claim 1, wherein each of the plurality of transducers is bonded to a surface of the resonant structure.

15. The gyroscope of claim 1, wherein a surface of the resonant structure includes holes formed in the resonant structure.

16. The gyroscope of claim 15, wherein electric wires extend through the holes and are electrically connected to the transducers.

17. The gyroscope of claim 1, wherein the resonant structure comprises a plurality of beams.

18. A method of determining the rate of angular rotation of a gyroscope, the method comprising:
driving a vibrational mode in a resonant structure;
detecting vibrations in the resonant structure; and
determining the rate of angular rotation of the gyroscope from the detected vibrations;
wherein, the vibrational mode is driven and the vibrations are detected by a plurality of transducers that includes at least one piezoelectric monocrystal transducer and at least one piezoelectric non-monocrystal transducer.

19. The method of claim 18, wherein the plurality of transducers includes a first group of transducers that drive and detect a primary vibration mode of the resonant structure and a second group of transducers that detect and null a secondary vibration mode of the resonant structure.

20. The method of claim 19, wherein the first group of transducers and the second group of transducers include an equal number of piezoelectric non-monocrystal transducers.

* * * * *